US007263624B2

(12) United States Patent
Marchand et al.

(10) Patent No.: US 7,263,624 B2
(45) Date of Patent: Aug. 28, 2007

(54) METHODS AND APPARATUS FOR POWER CONTROL IN A SCALABLE ARRAY OF PROCESSOR ELEMENTS

(75) Inventors: Patrick R. Marchand, Apex, NC (US); Gerald George Pechanek, Cary, NC (US); Edward A. Wolff, Stockton, CA (US)

(73) Assignee: Altera Corporation, San Jose, CA (US)

( * ) Notice: Subject to any disclaimer, the term of this patent is extended or adjusted under 35 U.S.C. 154(b) by 210 days.

(21) Appl. No.: 11/128,742

(22) Filed: May 13, 2005

(65) Prior Publication Data

US 2005/0223253 A1 Oct. 6, 2005

Related U.S. Application Data

(62) Division of application No. 11/032,799, filed on Jan. 11, 2005, now Pat. No. 6,965,991, which is a division of application No. 09/853,989, filed on May 11, 2001, now Pat. No. 6,845,445.

(60) Provisional application No. 60/203,629, filed on May 12, 2000.

(51) Int. Cl.
*G06F 1/32* (2006.01)

(52) U.S. Cl. .............. 713/324; 713/323; 713/322; 713/320; 713/300
(58) Field of Classification Search .............. 713/324
See application file for complete search history.

(56) References Cited

U.S. PATENT DOCUMENTS

| 5,673,321 | A | * | 9/1997 | Lee .............................. 380/37 |
| 5,815,696 | A | * | 9/1998 | Tanaka et al. .............. 712/233 |
| 5,831,885 | A | * | 11/1998 | Mennemeier ............... 708/650 |
| 5,907,714 | A | * | 5/1999 | Boutaud et al. .............. 712/23 |
| 6,016,543 | A | * | 1/2000 | Suzuki et al. ............... 712/233 |
| 7,124,160 | B2 | * | 10/2006 | Saulsbury et al. .......... 708/490 |

* cited by examiner

*Primary Examiner*—James K. Trujillo
(74) *Attorney, Agent, or Firm*—Priest & Goldstein, PLLC

(57) ABSTRACT

Low power architecture features and techniques are provided in a scalable array indirect VLIW processor. These features and techniques include power control of a reconfigurable register file, conditional power control of multicycle operations and indirect VLIW utilization, and power control of VLIW-based vector processing using the ManArray register file indexing mechanism. These techniques are applicable to all processing elements (PEs) and the array controller sequence processor (SP) to provide substantial power savings.

20 Claims, 12 Drawing Sheets

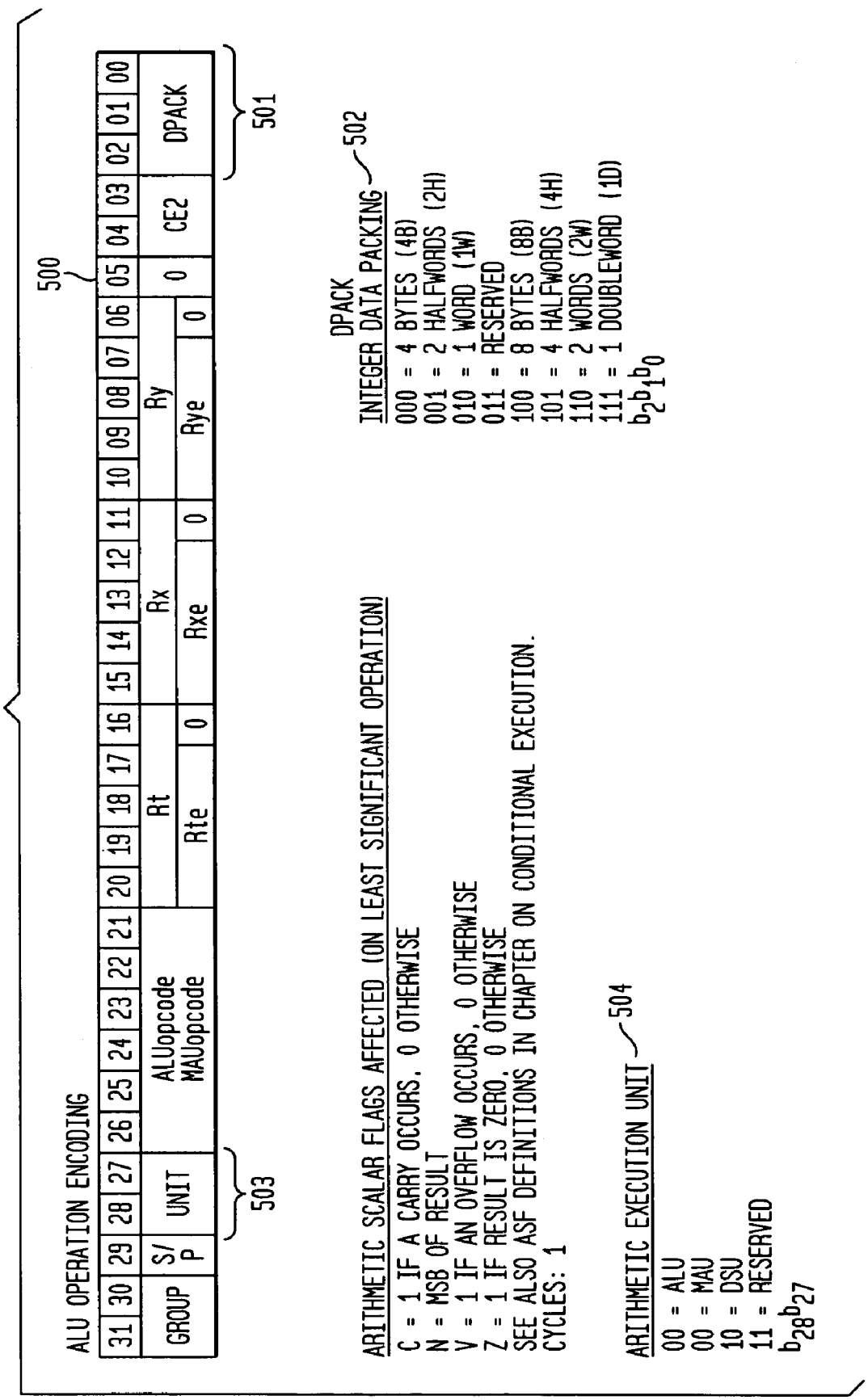

FIG. 5B

DESCRIPTION
THE SUM OF SOURCE REGISTERS Rx AND Ry IS STORED IN TARGET REGISTER Rt.
SYNTAX/OPERATION                                                              520

| INSTRUCTION | OPERANDS | OPERATION | ACF |
|---|---|---|---|
| | | | DOUBLEWORD |
| ADD.[SP][AM].1D | Rte, Rxe, Rye | Rto\|\|Rte ← Rxo\|\|Rxe + Ryo\|\|Rye | NONE |
| [TF].ADD.[SP][AM].1D | Rte, Rxe, Rye | DO OPERATION ONLY IF T/F CONDITION IS SATISFIED IN F0 | NONE |
| | | | WORD |
| ADD.[SP][AM].1W | Rt, Rx, Ry | Rt ← Rx + Ry | NONE |
| [TF].ADD.[SP][AM].1W | Rt, Rx, Ry | DO OPERATION ONLY IF T/F CONDITION IS SATISFIED IN F0 | NONE |
| | | | DUAL WORDS |
| ADD.[SP][AM].2W | Rte, Rxe, Rye | Rto ← Rxo + Ryo<br>Rte ← Rxe + Rye | NONE |
| [TF].ADD.[SP][AM].2W | Rte, Rxe, Rye | DO OPERATION ONLY IF T/F CONDITION IS SATISFIED IN F0 | NONE |
| | | | DUAL HALFWORDS |
| ADD.[SP][AM].2H | Rt, Rx, Ry | Rt.H1 ← Rx.H1 + Ry.H1<br>Rt.H0 ← Rx.H0 + Ry.H0 | NONE |
| [TF].ADD.[SP][AM].2H | Rt, Rx, Ry | DO OPERATION ONLY IF T/F CONDITION IS SATISFIED IN F0 | NONE |
| | | | QUAD HALFWORDS |
| ADD.[SP][AM].4H | Rte, Rxe, Rye | Rto.H1 ← Rxo.H1 + Ryo.H1<br>Rto.H0 ← Rxo.H0 + Ryo.H0<br>Rte.H1 ← Rxe.H1 + Rye.H1<br>Rte.H0 ← Rxe.H0 + Rye.H0 | NONE |
| [TF].ADD.[SP][AM].4H | Rte, Rxe, Rye | DO OPERATION ONLY IF T/F CONDITION IS SATISFIED IN F0 | NONE |
| | | | QUAD BYTES |
| ADD.[SP][AM].4B | Rt, Rx, Ry | Rt.B3 ← Rx.B3 + Ry.B3<br>Rt.B2 ← Rx.B2 + Ry.B2<br>Rt.B1 ← Rx.B1 + Ry.B1<br>Rt.B0 ← Rx.B0 + Ry.B0 | NONE |
| [TF].ADD.[SP][AM].4B | Rt, Rx, Ry | DO OPERATION ONLY IF T/F CONDITION IS SATISFIED IN F0 | NONE |
| | | | OCTAL BYTES |
| ADD.[SP][AM].8B | Rte, Rxe, Rye | Rto.B3 ← Rxo.B3 + Ryo.B3<br>Rto.B2 ← Rxo.B2 + Ryo.B2<br>Rto.B1 ← Rxo.B1 + Ryo.B1<br>Rto.B0 ← Rxo.B0 + Ryo.B0<br>Rte.B3 ← Rxe.B3 + Rye.B3<br>Rte.B2 ← Rxe.B2 + Rye.B2<br>Rte.B1 ← Rxe.B1 + Rye.B1<br>Rte.B0 ← Rxe.B0 + Rye.B0 | NONE |
| [TF].ADD.[SP][AM].8B | Rte, Rxe, Rye | DO OPERATION ONLY IF T/F CONDITION IS SATISFIED IN F0 | NONE |

MPYA-MULTIPLY ACCUMULATE ENCODING

FIG. 6A 600

| 31 30 | 29 28 27 | 26 25 24 23 22 21 | 20 19 18 17 16 | 15 | 14 13 12 11 | 10 09 08 07 06 | 05 04 03 | 02 01 00 |
|---|---|---|---|---|---|---|---|---|
| GROUP | S/P UNIT | MAUopcode | Rte | 0 | Rx | Ry | CE3 | MPACK |

SYNTAX/OPERATION FIG. 6B 620

| INSTRUCTION | OPERANDS | OPERATION | ACF |
|---|---|---|---|
| | | | WORD |
| MPYA.[SP]M.1[SU]W | Rte, Rx, Ry | DO OPERATION BELOW BUT DO NOT AFFECT ACFs | NONE |
| MPYA[CNVZ].[SP]M.1[SU]W | Rte, Rx, Ry | Rto\|\|Rte ← Rto\|\|Rte + (Rx * Ry) | F0 |
| [TF].MPYA.[SP]M.1[SU]W | Rte, Rx, Ry | DO OPERATION ONLY IF T/F CONDITION IS SATISFIED IN ACFs | NONE |
| | | | DUAL HALFWORDS |
| MPYA.[SP]M.2[SU]H | Rte, Rx, Ry | DO OPERATION BELOW BUT DO NOT AFFECT ACFs | NONE |
| MPYA[CNVZ].[SP]M.2[SU]H | Rte, Rx, Ry | Rto ← Rto + (Rx.H1 * Ry.H1)<br>Rte ← Rte + (Rx.H0 * Ry.H0) | F1<br>F0 |
| [TF].MPYA.[SP]M.2[SU]H | Rte, Rx, Ry | DO OPERATION ONLY IF T/F CONDITION IS SATISFIED IN ACFs | NONE |
| | | | QUAD BYTES |
| MPYA.[SP]M.4[SU]B | Rte, Rx, Ry | DO OPERATION BELOW BUT DO NOT AFFECT ACFs | NONE |
| MPYA.[CNVZ].[SP]M.4[SU]B | Rte, Rx, Ry | Rto.H1 ← Rto.H1 + (Rx.B3 * Ry.B3)<br>Rto.H0 ← Rto.H0 + (Rx.B2 * Ry.B2)<br>Rte.H1 ← Rte.H1 + (Rx.B1 * Ry.B1)<br>Rte.H0 ← Rte.H0 + (Rx.B0 * Ry.B0) | F3<br>F2<br>F1<br>F0 |
| [TF].MPYA.[SP]M.4[SU]B | Rte, Rx, Ry | DO OPERATION ONLY IF T/F CONDITION IS SATISFIED IN F0 | NONE |

FIG. 6C 640

ARITHMETIC SCALAR FLAGS AFFECTED
(ON LEAST SIGNIFICANT OPERATION)
C = NOT AFFECTED
N = MSB OF RESULT
V = NOT AFFECTED
Z = 1 IF RESULT IS ZERO
    0 OTHERWISE
CYCLES: 2

ARITHMETIC EXECUTION UNIT
00 = ALU
00 = MAU
10 = DSU
11 = RESERVED
$b_{28}b_{27}$

INSTRUCTION GROUP
00 = RESERVED
00 = FLOW CONTROL
10 = LOAD/STORE (LU, SU)
11 = ARITHMETIC/LOGICAL
     (ALU, MAU, DSU)
$b_{31}b_{30}$

MPACK-MULTIPLY DATA PACKING
000 = RESERVED
001 = 2 HALFWORDS (2H)
010 = 1 WORD (1W)
011 = RESERVED
100 = RESERVED
101 = 4 HALFWORDS (4H)
      FOR MPYH AND MPYL
110 = RESERVED
111 = RESERVED
$b_2b_1b_0$

SP/PE SELECT
0 = SP
1 = PE

METHODS AND APPARATUS FOR POWER CONTROL IN A SCALABLE ARRAY OF PROCESSOR ELEMENTS

The present application is a divisional of U.S. Ser. No. 11/032,799, filed Jan. 11, 2005 now U.S. Pat No. 6,965,991; which is a divisional of U.S. Ser. No. 09/853,989, filed May 11, 2001 now U.S. Pat No. 6,845,445, which claims the benefit of U.S. Provisional Application Ser. No. 60/203,629 filed May 12, 2000.

FIELD OF THE INVENTION

The present invention relates generally to improved techniques for power control in a scalable pipelined array processor. More particularly, the present invention addresses, among its many aspects, advantageous techniques for power control including processing elements with power control of a reconfigurable register file, conditional power control of multi-cycle operations and indirect VLIW utilizations, and power control of VLIW-based vector processing using the ManArray register file indexing mechanism.

BACKGROUND OF THE INVENTION

Processors designed to be embedded in system on a chip type products are not only required to have high performance but to provide this performance with low power consumption and small area. A low power design is achieved through architecture, micro-architecture design, implementation physical design, process, and software control innovations. A low power processor architecture defines the instruction set and programming model which facilitates low power. The micro-architecture design represents the data flow paths, control logic, and state machine design of the defined processor architecture. For a low power architecture, the micro-architecture design takes advantage of the instruction set architecture to reduce power in the implementation of the core design.

The general power equation is power=$CV^2f$ where C is the capacitance, V is the power supply voltage, and f is the frequency of change of the signals. More specifically, the power consumption of an embedded core processor can be split into three major components: power=$P_{logic}+P_{RAM}+P_{I/O}$. The $P_{logic}$ portion is the power utilization attributable to the logic, the $P_{RAM}$ portion is the power attributable to the embedded RAM, and the $P_{I/O}$ portion is the power attributable to external pin changes directly attributable to the embedded core processor. Examples of $P_{I/O}$ power are data movement on and off the core and paging in new program segments. Minimizing data and program code movement, reducing capacitance by minimizing path lengths through good floor planning, minimizing the amount of required embedded RAM, and reducing the number of register file and embedded RAM accesses all would reduce power consumptions in an embedded core processor.

Reducing embedded RAM at the expense of expanding external RAM, however, is not necessarily a good tradeoff. Reducing embedded RAM due to more efficient program use of the on chip resources is a good tradeoff. Appropriate control or management of other functions such as clock gating is also important to minimize power. When functions are not used during different time periods, gating the clock off to the unused logic for those periods reduces the switching of signals thereby reducing power. Reducing path lengths through good floor planning reduces capacitance thereby also reducing power. Various prior art processor implementation processes provide technologies that run at low voltage. Such low voltage operation has a big impact on power by reducing the $V^2$ component of the power equation. The implementation process also will have a characteristic capacitance that all signals see and that has a direct effect on power use. Finally, the software controls how the hardware is used and can therefore have an effect on the power utilized to accomplish some task. Each of these areas contributes to the overall power utilization of the final processor design and each area must be designed to obtain the lowest power.

Low power approaches many times can conflict with high performance requirements. This conflict occurs typically because the primary approach to achieving high performance is through high clock rates. For example, the use of complex high path length instructions, which minimize register file, instruction, and data memory accesses and which also significantly improve the efficiency of processing an algorithm and consequently can lower power use, would not typically be used in a high clock rate designed processor. If the complex instruction was to be implemented in a high clock rate design, then the complex function would be broken up into multiple pipeline stages which directly affects the complexity of the design and of the programming model. Thus, the increased complexity hardware and less efficient programming utilization can mask out any power improvements obtained from the higher clock rates.

Consequently, another approach to achieve high performance is needed. In the ManArray processor, high performance is achieved through parallelism and the use of highly efficient instructions rather than through high clock rates. This approach allows the full benefit of lowering the voltage in new processes to be achieved. By requiring short signal lengths and low power memories, the ManArray processor can achieve both high performance and low power. Even so, all the five areas (architecture, micro-architecture design, implementation physical design, process and software) for lowering the power need to be addressed in order to maximize the battery life in portable products containing a ManArray processor. The ManArray architecture and micro-architecture provide novel features that are scalable and can lower power utilization in each member of the scalable array family of cores as will be described.

The sequential model of instruction execution is used in the advanced indirect very long instruction word (iVLIW) scalable ManArray processor even though multiple PEs operate in parallel each executing up to five packed data instructions. The ManArray family of core processors provides multiple cores 1×1, 1×2, 2×2, 2×4, 4×4, and so on that provide different performance characteristics depending upon the number of and type of processor elements (PE) used in the cores.

Each PE typically contains its own register file and local PE memory, resulting in a distributed memory and distributed register file programming model. Each PE, if not masked off, executes instructions in synchronism and in a sequential flow as dictated by the instruction sequence fetched by a sequence processor (SP) array controller. The SP controls the fetching of the instructions that are sent to all the PEs. The ManArray architecture in one exemplary implementation uses multiple forms of selectable parallelism including, iVLIW with up to 5 instructions issued in parallel, packed data operations with up to 8 byte operations per instruction per cycle, and array PE parallelism with up to 16 PEs each capable of 5 instructions*8 byte operations=40 operations per PE for a total of 640 operations per 4×4 array per cycle. Since the parallel operations are selectable and since many algorithms use varying degrees of parallelism in their coding, the control of the processor array for low power operation is highly advantageous.

Thus, it is recognized that it will be highly advantageous to have architecture and micro-architecture low power features provided in a scalable processor family of embedded cores based on a single architecture model that uses common tools to support software configurable processor designs optimized for performance, power, and price across multiple types of applications using standard application specific integral circuit (ASIC) processes as discussed further below.

SUMMARY OF THE INVENTION

In one aspect of the present invention, the ManArray configurable register file is appropriately controlled to reduce power in each PE and in the SP. In addition, PE masking is used to reduce power to those PEs that are not active. In another aspect, power can be reduced in conditionally executing multi-cycle operations where execution cycles are curtailed as soon as the execution conditions have been determined. Also, power can be reduced in a VLIW execution since there is no need to read the same VIM location as the previous execute (XV) VLIW instruction that used the same VIM address. In a further aspect, power can be reduced in a ManArray processor that supports register file indexing (RFI) since there is no need to read the same VIM location on each XV received that is using RFI.

These and other advantages of the present invention will be apparent from the drawings and the Detailed Description which follow.

BRIEF DESCRIPTION OF THE DRAWINGS

FIG. 5A illustrates an exemplary ManArray ALU instruction encoding with specific fields identified;

FIG. 5B illustrates an exemplary ManArray ALU ADD syntax/operation table for the instruction of FIG. 5A.

FIGS. 6A, 6B and 6C illustrate an exemplary ManArray multiply accumulate (MPY) instruction encoding, a corresponding syntax operation table, and a bit definition table, respectively;

DETAILED DESCRIPTION

Figure 1:
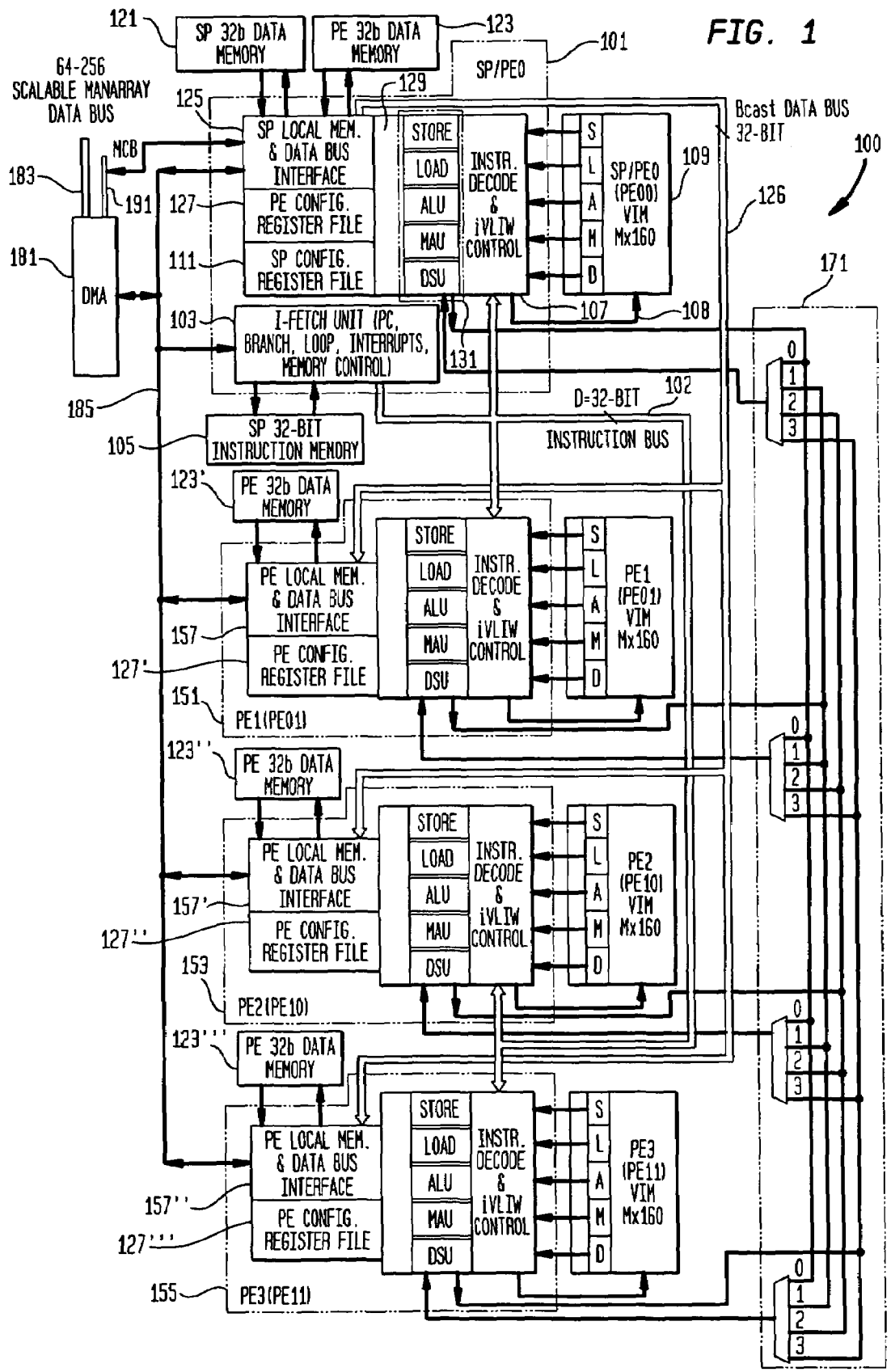
FIG. 1 illustrates a ManArray 2×2 iVLIW processor which may suitably be employed with this invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999, now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/337,839 filed Jun. 22, 1999, now U.S. Pat. No. 6,839,728, U.S. patent application Ser. No. 09/350,191 filed Jul. 9, 1999, now U.S. Pat. No. 6,356,994.

U.S. patent application Ser. No. 09/422,015 filed Oct. 21, 1999 entitled "Methods and Apparatus for Abbreviated Instruction and Configurable Processor Architecture", now U.S. Pat. No. 6,408,382, U.S. patent application Ser. No. 09/432,705 filed Nov. 2, 1999 entitled "Methods and Apparatus for Improved Motion Estimation for Video Encoding", now U.S. Pat. No. 6,697,427, U.S. patent application Ser. No. 09/471,217 filed Dec. 23, 1999 entitled "Methods and Apparatus for Providing Data Transfer Control", now U.S. Pat. No. 6,260,082, U.S. patent application Ser. No. 09/472,372 filed Dec. 23, 1999 entitled "Methods and Apparatus for Providing Direct Memory Access Control", now U.S. Pat. No. 6,256,683, U.S. patent application Ser. No. 09/596,103, entitled "Methods and Apparatus for Data Dependent Address Operations and Efficient Variable Length Code Decoding in a VLIW Processor" filed Jun. 16, 2000, now U.S. Pat. No. 6,397,324, U.S. patent application Ser. No. 09/598,567, entitled "Methods and Apparatus for Improved Efficiency in Pipeline Simulation and Emulation" filed Jun. 21, 2000, now U.S. Pat. No. 6,826,522, U.S. patent application Ser. No. 09/598,564, entitled "Methods and Apparatus for Initiating and Resynchronizing Multi-Cycle SIMD Instructions" filed Jun. 21, 2000, now U.S. Pat. No. 6,622,238, U.S. patent application Ser. No. 09/598,566, entitled "Methods and Apparatus for Generalized Event Detection and Action Specification in a Processor" filed Jun. 21, 2000, and now U.S. Pat. No. 6,735,690, U.S. patent application Ser. No. 09/598,084, entitled "Methods and Apparatus for Establishing Port Priority Functions in a VLIW Processor" filed Jun. 21, 2000, now U.S. Pat. No. 6,654,870, U.S. patent application Serial No. 09/599,980, entitled "Methods and Apparatus for Parallel Processing Utilizing a Manifold Array (ManArray) Architecture and Instruction Syntax" filed Jun. 22, 2000, now U.S. Pat. No. 6,748,517, U.S. patent application Ser. No. 09/791,940, entitled "Methods and Apparatus for Providing Bit-Reversal and Multicast Functions Utilizing DMA Controller" filed Feb. 23, 2001, now U.S. Pat. No. 6,834,295, U.S. patent application Ser. No. 09/792,819, entitled "Methods and Apparatus for Flexible Strength Coprocessing Interface" filed Feb. 23, 2001, now U. S. Pat. No. 8,865,663, U.S. patent application Ser. No. 09/791,256, entitled "Methods and Apparatus for Scalable Array Processor Interrupt Detection and Response" filed Feb. 23, 2001, now U.S. Pat. No. 6,842,811, as well as, Provisional Application Ser. No. 60/113,637, entitled "Methods and Apparatus for Providing Direct Memory Access (DMA) Engine" filed Dec. 23, 1998, Provisional Application Ser. No. 60/113,555, entitled "Methods and Apparatus Providing Transfer Control" filed Dec. 23, 1998, Provisional Application Ser. No. 60/139,946, entitled "Methods and Apparatus for Data Dependent Address Operations and Efficient Variable Length Code Decoding in a VLIW Processor" filed Jun. 18, 1999, Provisional application Ser. No. 60/140,245, entitled "Methods and Apparatus for Generalized Event Detection and Action Specification in a Processor" filed Jun. 21, 1999, Provisional Application Ser. No. 60/140,163, entitled "Methods and Apparatus for Improved Efficiency in Pipeline Simulation and Emulation" filed Jun. 21, 1999, Provisional Application Serial No. 60/140,162, entitled "Methods and Apparatus for Initiating and Re-Synchronizing Multi-Cycle SIMD Instructions" filed Jun. 21, 1999, Provisional Application Ser. No. 60/140,244, entitled "Methods and Apparatus for Providing One-By-One Manifold Array (1×1 ManArray) Program Context Control" filed Jun. 21, 1999, Provisional Application Ser. No. 60/140,325, entitled "Methods and Apparatus for Establishing Port Priority Function in a VLIW Processor" filed Jun. 21, 1999, Provisional Application Ser. No. 60/140,425, entitled "Methods and Apparatus for Parallel Processing Utilizing a Manifold Array (ManArray) Architecture and Instruction Syntax" filed Jun. 22, 1999, Provisional Application Ser. No. 60/165,337, entitled "Efficient Cosine Transform Implementations on the ManArray Architecture" filed Nov. 12, 1999, and Provisional Application Ser. No. 60/171,911, entitled "Methods and Apparatus for DMA Loading of Very Long Instruction Word Memory" filed Dec. 23, 1999, Provisional Application Ser. No. 60/184,668, entitled "Methods and Apparatus for Providing Bit-Reversal and Multicast Functions Utilizing DMA Controller" filed Feb. 24, 2000, Provisional Application Ser. No. 60/184,529, entitled "Methods and Apparatus for Scalable Array Processor Interrupt Detection and Response" filed Feb. 24, 2000, Provisional Application Ser. No. 60/184,560, entitled "Methods and Apparatus for Flexible Strength Coprocessing Interface" filed Feb. 24, 2000, Provisional Application Ser. No. 60/203,629, entitled "Methods and Apparatus for Power Control in a Scalable Array of Processor Elements" filed May 12, 2000, Provisional Application Ser. No. 60/241,940, entitled "Methods and Apparatus for Efficient Vocoder Implementations" filed Oct. 20, 2000, Provisional Application Ser. No. 60/251,072, entitled "Methods and Apparatus for Providing Improved Physical Designs and Routing with Reduced Capacitive Power Dissipation" filed Dec. 4, 2000, Provisional Application Ser. No. 60/283,582, entitled "Methods and Apparatus for Automated Generation of Abbreviated Instruction Set and Configurable Processor Architecture" filed Apr. 13, 2001, Provisional Application Ser. No. 60/287,270, entitled "Methods and Apparatus for Pipelined Bus" filed Apr. 27, 2001, and Provisional Application Ser. No. 60/288,965, entitled "Methods and Apparatus for Removing Compression Artifacts in Video Sequences" filed May 4, 2001, all of which are assigned to the assignee of the present invention and incorporated by reference herein in their entirety.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 are also utilized to demonstrate the scalable low power array control mechanisms. It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of short instruction words (SIW) or abbreviated-instruction words from a B-bit instruction memory 105, where B is determined by the application instruction-abbreviation process to be a reduced number of bits representing ManArray native instructions and/or to contain two or more abbreviated instructions as further described in U.S. patent application Ser. No. 09/422,015 filed Oct. 21, 1999 "Methods and Apparatus for Abbreviated Instruction and Configurable Processor Architecture," and incorporated by reference herein in its entirety. If an instruction abbreviation apparatus is not used then B is determined by the SIW format, for example, 32-bits as shown in memory 105. The fetch controller 103 provides the typical functions needed in a programmable processor, such as a program counter (PC), a branch capability, eventpoint loop operations (see U.S. Provisional Application Ser. No. 60/140,245 entitled "Methods and Apparatus for Generalized Event Detection and Action Specification in a Processor" filed Jun. 21, 1999 for further details), and support for interrupts. It also provides the instruction memory control which could include an instruction cache if needed by an application.

In addition, the I-fetch controller 103 dispatches instruction words and instruction control information to the other PEs in the system by means of a D-bit instruction bus 102. D is determined by the implementation, which for the exemplary ManArray coprocessor shown in FIG. 1, D=32-bits. The instruction bus 102 may include additional control signals as needed in an abbreviated-instruction translation apparatus. The ManArray processor uses a short fetch, decode execute1, execute2 (if needed), condition-return pipeline which is dynamically expanded to include a VIM fetch cycle on execute VLIW (XV) instructions. This pipeline is described in further detail in U.S. application Ser. No. 09/228,374 entitled "Methods and Apparatus to Dynamically Reconfigure the Instruction Pipeline of an Indirect Very Long Instruction Word Scalable Processor" filed Jan. 12, 1999, and incorporated by reference herein in its entirety.

In the exemplary system 100, common elements are used throughout to simplify the explanation, though actual implementations are not limited to this restriction. For example, the execution units 131 in the combined SP/PE0 101 can be separated into a set of execution units optimized for the control function, for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D).

The basic concept of loading the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common design PE reconfigurable register file 127 which is described in further detail in U.S. patent application Ser. No. 09/169, 255 entitled "Method and Apparatus for Dynamic Instruction Controlled Reconfiguration Register File with Extended Precision". Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common design physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. Pat. No. 6,023,753 entitled "Manifold Array Processor", and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1. Further details of presently preferred DMA control and coprocessing interface techniques are found in Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,560 entitled "Methods and Apparatus for Flexible Strength Coprocessing Interface" filed Feb. 24, 2000, and Provisional Application Ser. No. 60/184,529 entitled "Methods and Apparatus for Scalable Array Processor Interrupt Detection and Response" filed Feb. 24, 2000, respectively, which are incorporated by reference in their entirety herein.

Low Power Control Mechanisms

One of the low power control techniques is a "sleep" mode for PEs. There are varying degrees of the sleep mode in an array processor such as the processor 100 shown in FIG. 1. The full system of SP and PEs can be placed into a sleep mode by doing a write to an internal special purpose register (SPRs), the stop register. In the ManArray architecture, a store to special purpose register (SSPR) instruction is used with the stop register as the target. The SPRs are registers which provide specialized control and communications capabilities. Most of the SPRs can be accessed in a single cycle by the SP (SP SPRs) or PE (PE SPRs) using the SSPR instructions. A ManArray control bus (MCB) master unit can also access many of the SPRs.

Figure 2A:
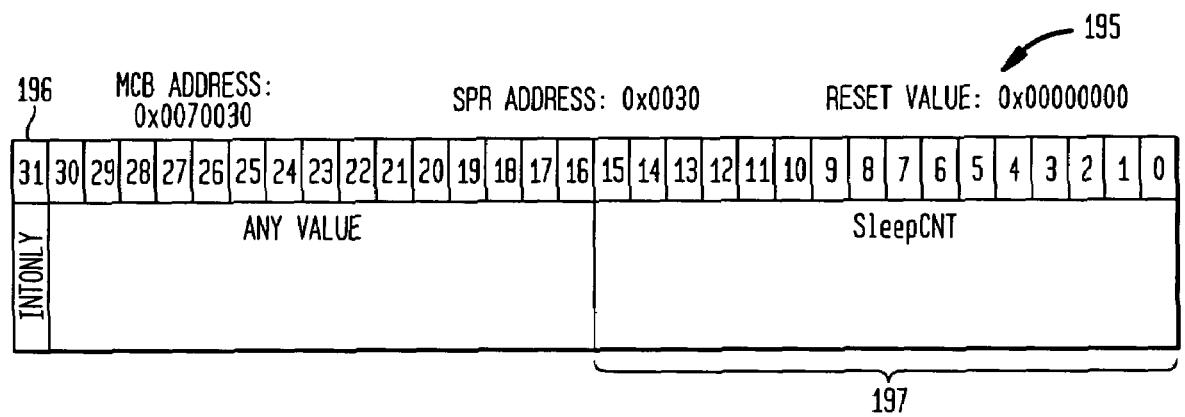
FIG. 2A illustrates a special purpose register (SPR) STOP register format in accordance with the present invention.

Specifically, the instruction SSPR STOP, Rx writes the contents of the CRF Rx register to the special purpose stop register. A digital signal processor (DSP) or MCB write to the stop register will cause the DSP to stop fetching instructions until an unmasked interrupt is detected in the IRR. Writing to the stop register allows the programmer to place the DSP into a lower power state in which the absolute minimum number of busses and register bits change state until a significant event (signaled by an interrupt) occurs. An SPR STOP register format 195 is shown in FIG. 2A. It includes an IntOnly control bit 196 that indicates how the processor can be awoken from sleep mode and a SleepCNT 197 containing a cycle counter value which when counted out would interrupt the SP to begin processing.

When the IntOnly bit 196 is 0, the processor sleeps until SleepCnt cycles elapse or any enabled interrupt occurs. Where IntOnly bit 196 is 1, sleep occurs only until an enabled interrupt occurs. The SleepCNT field 197 establishes the number of cycles the DSP should sleep. Any interrupt that occurs will clear this register to a zero and wake the DSP up.

There are a number of ways the processor array core enters the sleep mode. In one approach, a HOLD_PIPE signal is generated which stalls the pipeline holding its state and causing the clocks to be gated off for the SP and PEs. A second approach is to flush the pipeline and then enter into the sleep state. This latter approach allows opportunities to minimize internal state so that less power is consumed in the sleep state, thereby maximizing battery life. During the sleep state, the DMA function and memories may continue if programmed appropriately to load the core's memories while the processor SP and PEs are in a sleep mode. When the DMA is complete, it would cause an interrupt to awaken the processor.

Whether an instruction executes in the SP or in the PEs is easily determined by examining the S/P-bit included in ManArray instructions. This bit differentiates PE from SP instructions where the PEs are inactive when SP only instructions are in execution. In addition, with proper low power design in a number of instances, some of the PEs are masked off. There are a number of ways the PEs can be placed into a sleep mode while maintaining their state. One way is through the specific program setting of PE mask bits, which selectively controls whether a PE is active or inactive.

Each PE has a mask bit located in, for example, the status and control register 1 (SCR1) of the ManArray Processor. Another way is when SP only instructions are executing which is determined through the SP/PE (S/P) bit in each ManArray instruction. In arrays greater in size than 2×2, when a PE is masked off, only PE communication DSU instructions are allowed to be decoded and provide control information to the cluster switch, such as cluster switch 171 shown in FIG. 1. In 2×2 or smaller arrays, when a PE is masked off, no instructions are executed either wholly or partially. All other execution units in a masked off PE are to remain inactive and consequently are controlled through clock gating or other mechanisms to minimize power. For array sizes larger than 2×2 and for DSU instructions other than the PE communication instructions, no operation is to occur in masked off PEs.

In the Man Array processor 100 of FIG. 1, short 32-bit instruction words (SIWs) can be executed in multiple PEs in parallel. These SIWs do not use the VIM and only use one out of the five available execution units during execution. For this type of operation, all unused execution units are controlled through clock gating or other mechanisms to minimize power. An example of other mechanisms includes forcing a no operation "nop" condition to be determined in the unused execution units. Even in VLIWs, an execution unit slot may not be used either (1) being disabled by the disable bit stored in VIM, (2) not enabled by an execute VLIW (XV) instruction (see U.S. Pat. No. 6,151,668), or (3) disabled by an nop instruction. A "nop" condition can be forced by setting the group bits, bits 31 and 30 to a control instruction setting, which is treated as an nop in each execution unit. This approach can be advantageously used to keep the PE array off when an SP-only instruction is executing. By keeping the PE array off, one can gate the clock off to the whole PE array with an attendant savings in power.

Figure 2B:
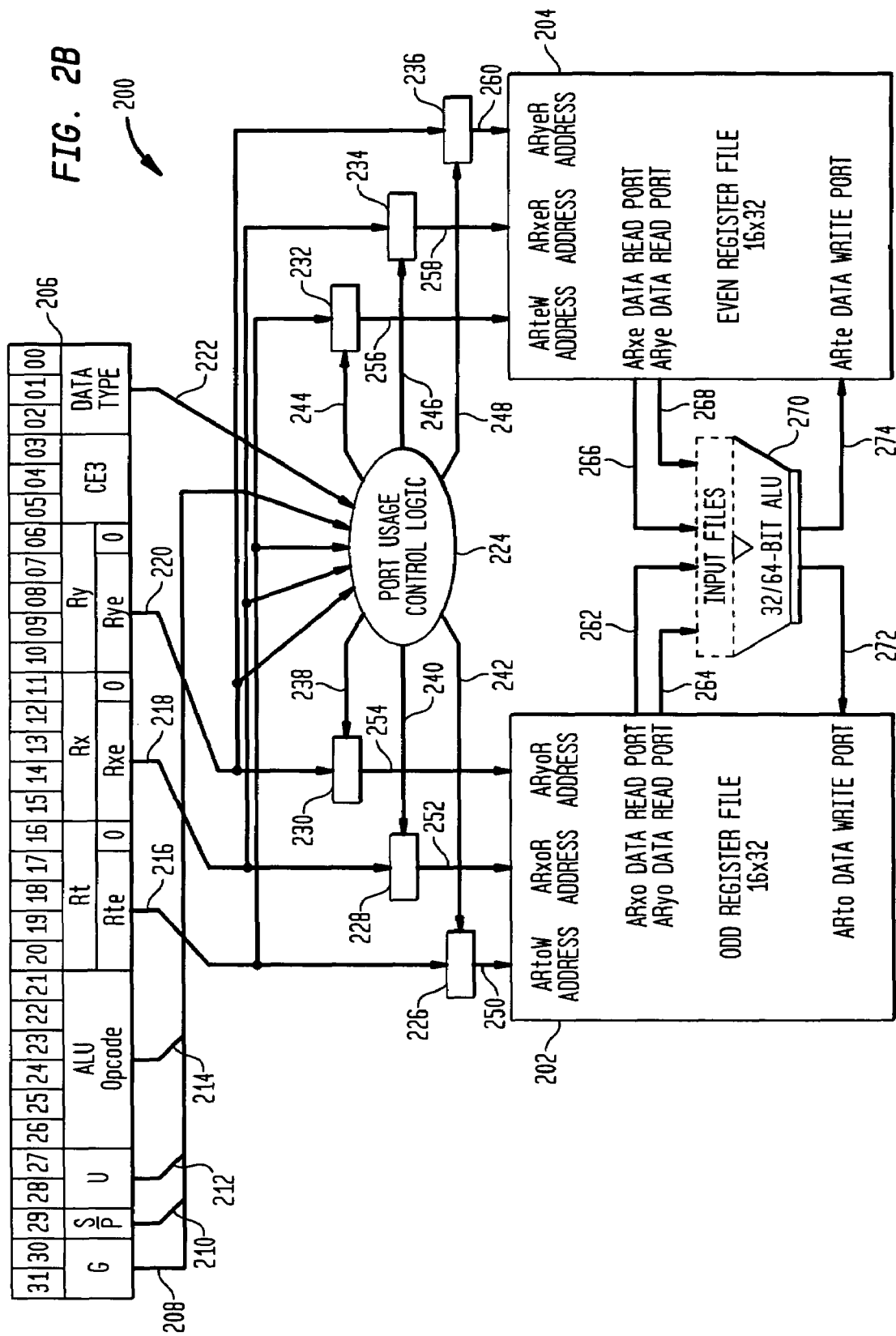
FIG. 2B illustrates a 32×32 reconfigurable register file with a single execution unit in accordance with the present invention.

A reconfigurable register file with port address latches and port usage control logic system 200 as used in each PE and SP of FIG. 1 is shown in FIG. 2B for a subset of only one execution unit, the ALU, from the multi-execution units shown in the PEs of FIG. 1. Expansion with additional execution units is discussed further below. In FIG. 2B, an instruction is received into an instruction register 206 which controls the operation for that PE or SP. This instruction register 206 can be loaded with one of the instruction subsets of a VLIW read from the VIM, unit 109 of FIG. 1, in each PE or SP. Alternatively, in the PEs, the instruction register can hold a broadcast non-VLIW instruction for common execution on all enabled PEs. As a further alternative, in the SP, the instruction register can hold an SP-only non-VLIW instruction. Even though there are multiple instruction registers located in the array processor, each one holds only an instruction slated for execution. For purposes of clarity of illustration, FIG. 2B is focused on the control of a single execution unit applicable in each PE and in the SP. The reconfigurable register file shown in FIG. 2B is configured to have an even 16×32-bit file 204 and an odd 16×32-bit file 202. Each register file portion has a size, 16×32-bits in this case, that is dictated by the architecture. The present ManArray architecture uses a 32×32 register file operand bit-field specification in each instruction, available to the control logic on interface paths Rt 216, Rx 218, and Ry 220. It will be recognized that low power control of a reconfigurable register file in accordance with the present invention is not limited to this size and that other sizes are possible, such as a two 32×32-bit files arrangement that allows a 64×32-bit or 32×64-bit configuration, for example. It will be apparent to those of skill in the art, that other configurations will also be advantageous depending upon the desired application.

Each register file, for the supported execution unit, shown in FIG. 2B consists of two read ports, 262 and 264, and one write port, 272 for the odd register file 202 and two read ports, 266 and 268, and one write port 274 for the even register file 204. It is noted that a simpler execution unit can be used that requires only a single read port from the odd register file and a single read port from the even register file. To read a value from a stored entry in the register file, an address is supplied to the appropriate read port address input.

For example, in FIG. 2B, the ALU ARxo (odd) data read port 262 requires that an address be applied to ARxoR address 252 and the ALU ARyo (odd) data read port 264 requires that an address be applied to ARyoR address 254. The values read on the data read ports or outputs 262, 264, and/or 266, 268 are the input operands to the ALU execution unit 270. The input operands are read at the beginning of the execution cycle in the ManArray architecture. At the end of the execution cycle, a result has been generated at the output 272 and/or output 274 of the ALU 270 that is applied to the write ports of the register file ARto data write port 272 and/or ARte data write port 274.

The proper location to store the ALU result is determined from the write port address ARtoW address 250 in the odd register file 202 and ARteW address 256 in the even register file 204. With the reconfigurable register file architecture, both 32-bit and 64-bit results can be produced depending upon the instruction type. For 64-bit operations, four 32-bit values are read from the register file, two 32-bit values from each 16×32-bit file. For 32-bit operations, only two 32-bit values are read from the reconfigurable register file, where one or both of the values may be read from a single 16×32-bit file.

For example, in the case of 32-bit operations, it is desirable to control the register file such that if a port is not required in an operation, then that port should not change address values and cause a register file port read that utilizes power needlessly. Consequently, it is desirable to control each of the configurable register file portions to change the access port address lines as needed in support of the desired operation thereby meeting the operational requirements specified by the instruction but not using any more power than required.

In the prior art, register files have been typically implemented as a single grouping of registers without the ability to change the granularity of data accesses on a cycle-by-cycle basis and between instructions in a VLIW. In other words, in the ManArray processor with a reconfigurable register file, a VLIW instruction can have one execution unit accessing a 64-bit data value from the register file which is treated as a 16×64-bit file for that instruction's execution cycle while another execution unit's instruction can be accessing a 32-bit data value from the same register file which is treated as a 32×32 file for that instruction's execution cycle. Then, in the very next cycle this accessing can be reversed such that the previous operation on 64-bit data is now a 32-bit operation and the previous 32-bit operation is now a 64-bit operation. By judicious control of the register file accesses, the power utilization can be minimized. This control determines whether a 16×32-bit file is to be accessed or not, and if it is not, then to not change the port address such that there is no change on the output data read port in the next cycle.

Figure 3A:
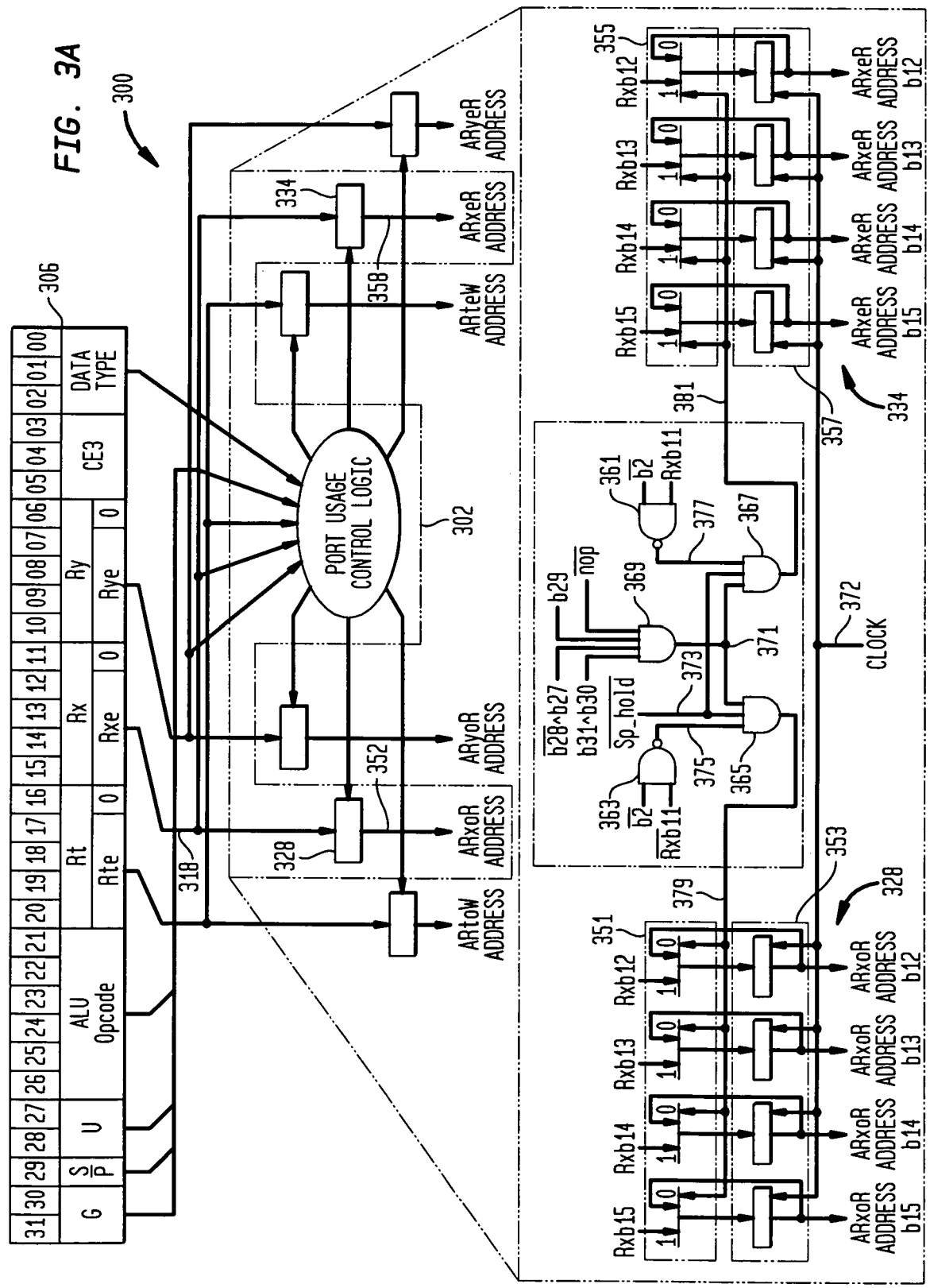
FIG. 3A illustrates an exemplary set of port usage control logic with state recirculating address latches in accordance with the present invention.

An exemplary control logic implementation to provide the reconfigurable register file selective control for a PE is depicted in outlined section 302 of port usage control logic system 300 of FIG. 3A. The symbols used in both FIGS. 3A and 3B include a bit number (b#) which indicates the bit number out of the instruction register, a hat symbol (^) indicates an AND of the specified bits, and an overbar symbol indicates a logical NOT of the specified signal. In FIG. 3A, control logic elements, 361, 363, 365, 367, and 369, for one set of read port address latches 328 and 334 are shown. Similar control logic is used in the SP except for bit 29 input to AND gate 369 which uses the correct form of bit 29 representing SP instructions. These controls are operable during the decode phase of the instruction pipeline. Address latches 353 and 357 are clocked every cycle representing the start of the execute cycle and are employed to maintain their same state by recirculating their output back to their input using multiplexers 351 and 355. The control of the multiplexers 351 and 355 is such that if the control lines 379 and 381, the outputs of AND gates 365 and 367, respectively, are "0", then the recirculation path is chosen. If the control lines 379 and 381 are a "1", then new data is introduced via multiplexers 351 and 355 from the Rx bit field 318 of instruction register 306. The control logic uses bits from the instruction register except for the $\overline{SP\_hold}$ signal which is a global signal indicating other processor events for which no operation is to occur and therefore controls both even and odd read port addresses equally. In order to read from either port, AND gate 369 must produce an enabling "1" value. The input to AND gate 369 is based upon the instruction in the instruction register 306 that must be an arithmetic instruction. Bits 31 and 30 must both be a "1", not a nop. In other words, $\overline{nop}$ is asserted. Further, the instruction must be a PE instruction if this operation is in a PE (bit 29), and the instruction must be an ALU instruction as governed by the unit field (U) bits 28 and 27. If signals 371 and 373 are both "1", then the data type and register specification controls whether the address latches are updated or not through NAND gates 361 and 363. Looking at NAND gate 361, if the instruction is a 32-bit instruction then $\overline{b2}$ will be a "1" as defined by the ManArray architecture. Also, see FIG. 5A which illustrates integer data packing for ALU operations (Dpack 502), for further definition of bit 2 (b2), and FIG. 5B which provides syntax/operation definitions for an ALU ADD instruction. If the operand read port Rx address is odd, then Rxb11 will be a "1" indicating that the even Rx register should not change. In other words, a single 32-bit read is to occur from the odd 16×32 register file only. With two "1"s on its inputs, the NAND gate 361 will produce a "0" output which forces output 381 of AND gate 367 to a "0" thereby recirculating the previous read port address state through multiplexers 355. Meanwhile, NAND gate 363 will have $\overline{b2}=1$ but $\overline{Rxb11}=0$ thereby producing a "1" on its output 375 which will cause AND gate 365 to produce an output of "1" on output 379 thereby allowing a new read port address to enter the odd read port address ARxoR register 353. Depending upon the instruction received and its specified usage of the register file, the control logic can alternate control of the read port latches cycle by cycle. Furthermore, pipelined versions of control signals 379 and 381 can be used to control the outputs of the register file if required by a particular implementation or design.

Figure 3B:
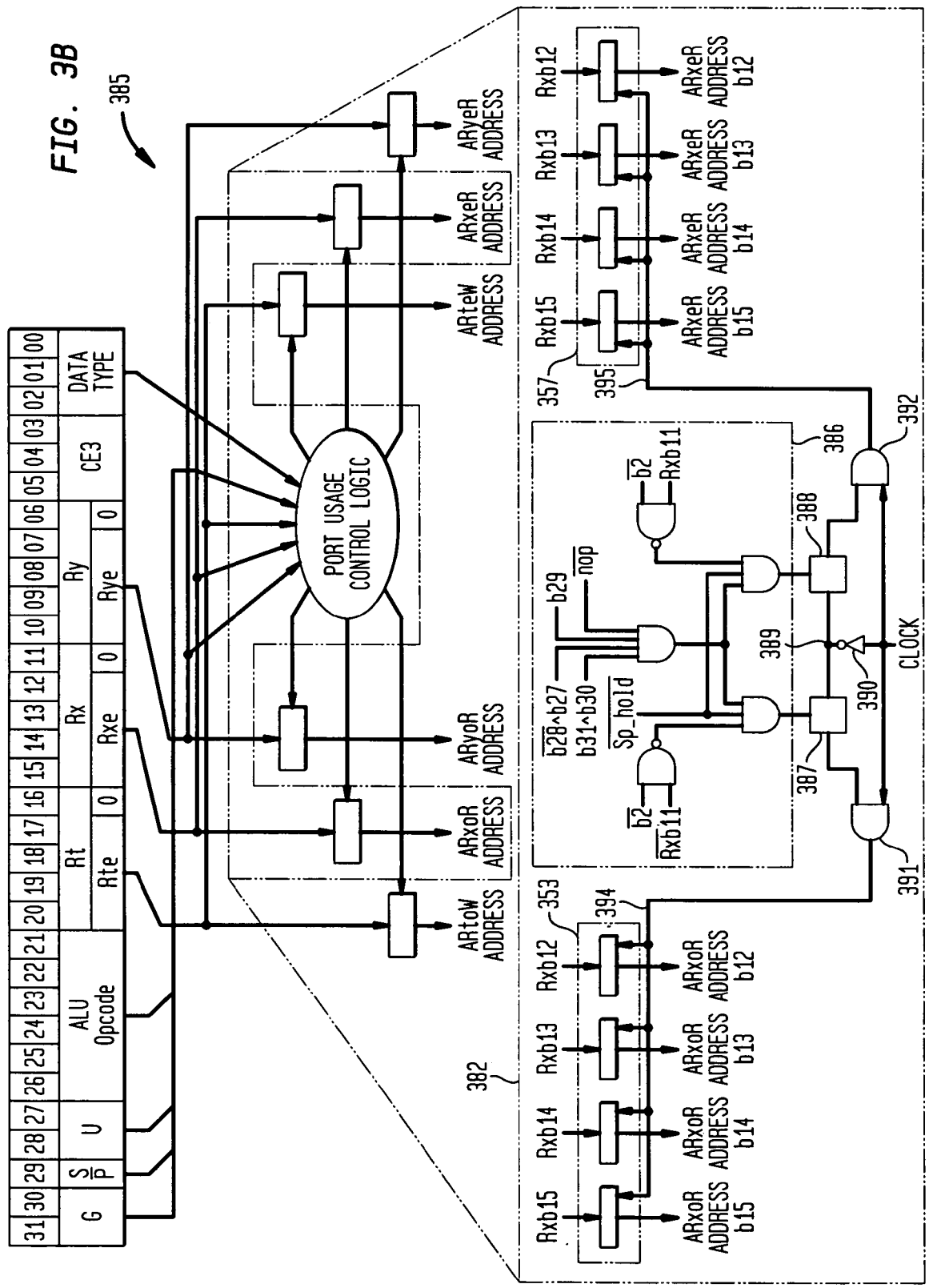
FIG. 3B illustrates an exemplary set of port, usage control logic with gated clock address latches in accordance with the present invention.

FIG. 3B illustrates a variation of the port usage control logic and read port address registers 382 that accomplishes the same result of preserving state when no change in state is required between the two register portions of the reconfigurable register file. The difference in the system 385 of FIG. 3B is that instead of using multiplexers, such as the multiplexers 351 and 355 of FIG. 3A, the clock 393 to the read port address registers, such as registers 353 and 357, is gated by AND gates 391 and 392 based upon control logic 386. The control logic 386 provides the inputs to clock gating latches 387 and 388. The clock gating latches 387 and 388 are clocked on a delayed or inverse clock 389 of normal PE clock 393. When no change is desired to occur, the clock to the register is gated off so no change of state can occur.

Figure 4:
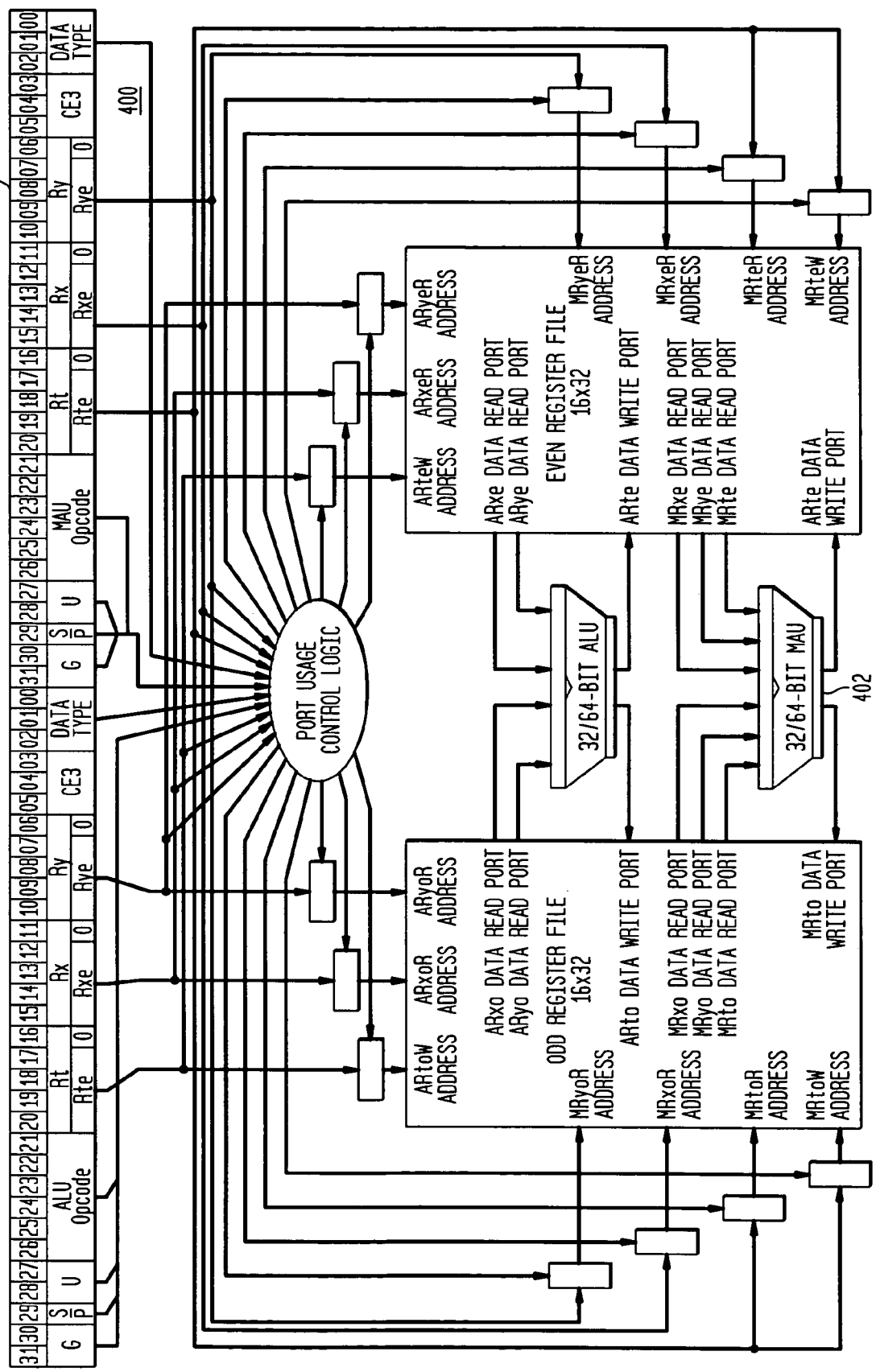
FIG. 4 illustrates a two instruction VLIW use of the 32×32 configurable register file.

FIG. 4 depicts a system and register file organization 400 similar to that of FIG. 2B, but with an additional execution unit a multiply accumulate unit MAU 402. The MAU 402 requires the target register Rt address be used not only for a write port but for a read port, as well as for multiply accumulate operations of the form: Rt=Rt+Rx*Ry. FIGS. 6A, 6B and 6C provide bitfield and syntax/operation definition for a multiply accumulate (MPYA) instruction. Since there are other MAU instructions that do not use the Rt address as a read port, there are conditions when the Rt read address port should not change state. These conditions can be determined from a logical test of different bits in the instruction in instruction register 406. The MAU Rt read address register may be built as a recirculating register using the approach shown in FIG. 3A or it may use the clock gating approach shown in FIG. 3B. The execution units and functional units within an execution unit can be controlled to minimize power. Since these are typically logical functions, such as an adder, the inputs to the units must be controlled to minimize switching activity when operation of those units is not required. For example, the outputs of the register file, which are destined to the execution units, can be filtered, either by the use of latches or AND gates, to minimize changes to the input signals of the execution units. An optional filter arrangement comprising input filters 275 to ALU 270 is shown in dashed lines in FIG. 2B. It will be recognized that a similar arrangement can be used with other execution units.

The full ManArray architecture, as shown in FIG. 1, has five execution units using a reconfigurable register file made up of two 16×32-bit portions each with eight read ports and four write ports. For each execution unit, the techniques described in FIGS. 3A, 3B, and 4 are used to reduce power in the full array core processor.

FIG. 5A illustrates an exemplary ManArray ALU instruction encoding format 500 in accordance with the present invention. In format 500, specific fields are identified. Bit definitions 502 and 504 for Dpack field 501, bits $b_2$ $b_1$ $b_0$, and unit field 503, bits $b_{28}$ $b_{27}$ are also illustrated in FIG. 5A.

FIG. 5B illustrates an exemplary ManArray ALU Add Syntax/Operation description 520 in accordance with the present invention.

FIGS. 6A, 6B and 6C illustrate an exemplary ManArray Multiply Accumulate (MPYA) instruction encoding format 600 with specific fields identified, a corresponding syntax/operation description 620, and bit definitions 640, respectively, in accordance with the present invention.

Another situation in which the techniques of the present invention can advantageously conserve power. This situation is for those load/store instructions where under conditional execution the load and store paths check the execution conditions during decode in the present ManArray implementation and consequently can stop the further execution of the load/store instructions by the end of decode if necessary. Pipeline restrictions can vary depending upon the processor architecture and the implementation. For example, in the presently preferred implementation, in the single cycle execution units within the MAU, ALU and DSU, the condition governing whether an execution should finish and write new state information at the end of execution is determined in the execution cycle. In the case of two or more cycle instructions, the second and following cycles of a multi-cycle operation can be stopped at the end of the first cycle if the condition is determined to be such that no execution is to occur. In this case, the execution control logic's determination whether to stop execution or continue it would be based in part on the conditional execution flags. The flags can be set by a previous instruction which can be a single-cycle execute type instruction. For two cycle or more instructions in this situation, the flags are valid by the end of the first execute cycle of the instruction.

The control of the multi-cycle execution units for power minimization can be extended with the CE3 partial conditional execution concept described in U.S. patent application Ser. No. 09/238,446 entitled "Methods and Apparatus to Support Conditional Execution in a VLIW-Based Array Processor with Subword Execution" which is incorporated herein in its entirety. Adapting the partial conditional execution concept to the present invention, the execution of packed data type operations can be conditional for each sub data type in a packed data operation. For those packed operations that take two or more cycles to execute, the execute cycles after the first execute cycle can be stopped for those sub data operations which the condition flags have determined are not to complete. By using clock gating or other control mechanisms, power utilization can be significantly reduced.

Power can also be conserved in iVLIW PEs by minimizing the local PE VIM accesses. In many software pipelined algorithms, a single VIM address is accessed multiple times on the start up sequence and the ending sequence where the issued XV contains enable bits that control which execution units, out of all available, are to be executed for that XV's cycle. This operation is described in further detail in U.S. Pat. No. 6,173,389 "Methods and Apparatus for Dynamic Very Long Instruction Word Sub-Instruction Selection for Execution Time Parallelism in An Indirect Very Long Instruction Word Processor".

Figure 7A:
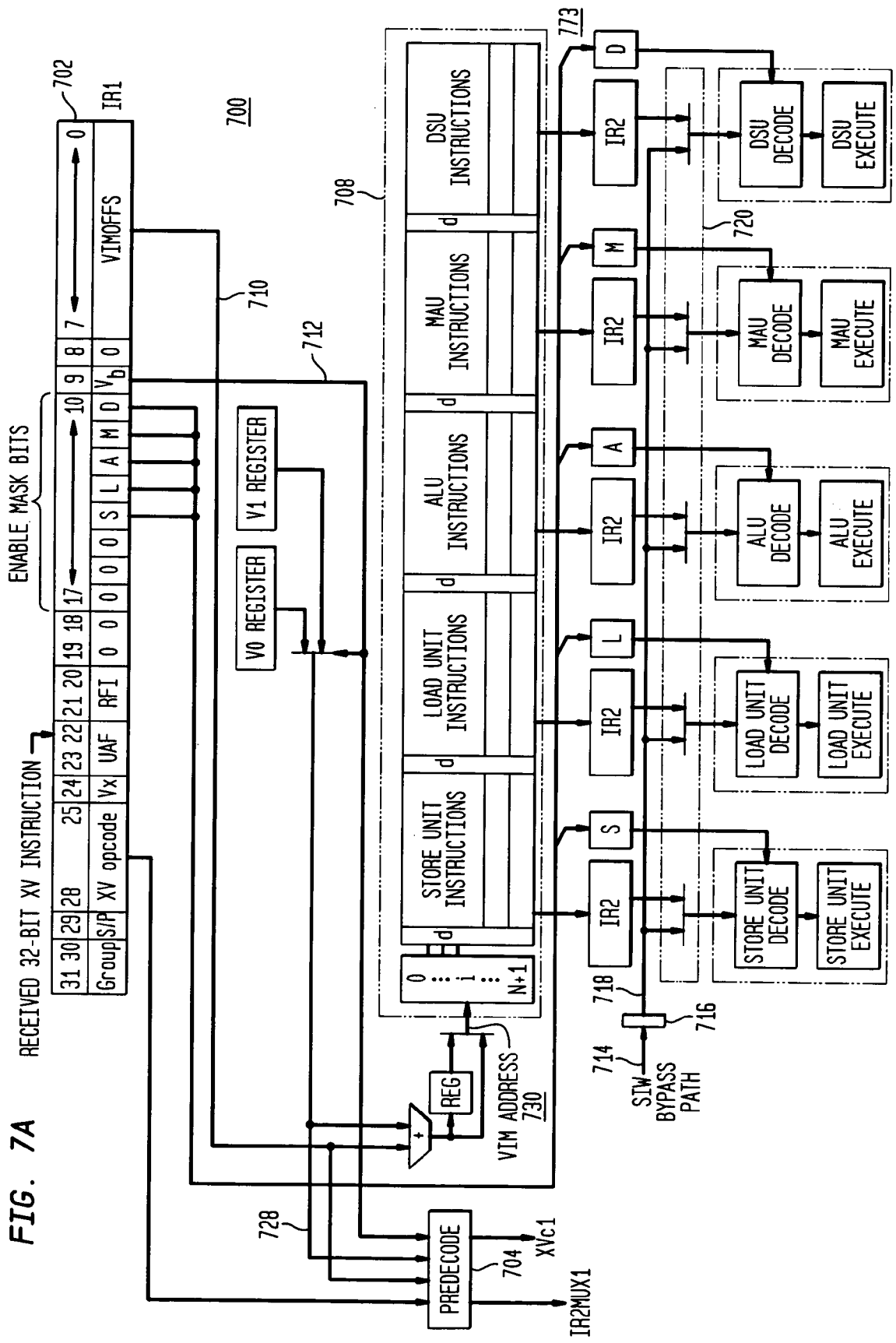
FIG. 7A illustrates an iVLIW XV pipeline with power control features in accordance with one embodiment of the present invention.

The accessing of the same VIM location is an event that can also occur in the software pipelined loops. To minimize power in such cases, the VIM need not be accessed for every subsequent XV, in a sequence of XV instructions, which access the same VIM Location. Each subsequent XV would have its VIMOFFS, Vb field and the contents of V0 or V1 checked. VIMOFFS is an offset to a VIM base register address value that is stored in V0 or V1 and selected by Vb. If they match with the previous XV, then the VIM output stored in the IR2 registers would not have to change and would be reused. FIG. 7A depicts a logical view 700 of an XV instruction received into an instruction register 1 (IR1) 702 which through predecode controls 704 provides a comparison of the VIMOFFS bits 710, the contents of V0 or V1 728, and Vb 712 with the previous XV's values in those fields to control VIM 708 access on subsequent XV instructions. An alternative comparison can be made with the calculated VIM address 730 with a stored version of the VIM address from the previous XV. To facilitate intervening non-iVLIW instructions, the SIW bypass path 714 would control multiplexer 720 to provide a latched version 716 of intervening SIW 718 to the appropriate decode and execution unit while preserving the VIM output in the IR2 registers 722.

Another case where power can be conserved is by utilizing the present invention in conjunction with register file indexing described in further detail in U.S. application Ser. No. 09/267,570 entitled "Methods and Apparatus for Providing Indirect Control of Register Addressing in a VLIW Processor" which is incorporated herein in its entirety. In register file indexing, a double indirect method of accessing a block of data in a register file is used to allow efficient implementations without the use of specialized vector processing hardware. In addition, the automatic modification of the register addressing is not tied to a single vector instruction nor to repeat or loop instructions. Rather, register file indexing (RFI) allows full programmer flexibility in control of the block data operational facility and provides the capability to mix non-RFI instructions with RFI instructions. The block-data operation facility is embedded in the iVLIW ManArray architecture allowing its generalized use across the instruction set architecture without specialized vector instructions or being limited in use only with repeat or loop instructions. The use of RFI in a processor containing multiple heterogeneous execution units which operate in parallel, such as VLIW or iVLIW processors, allows for efficient pipelining of algorithms across multiple execution units while minimizing the number of VLIW instructions required. In this technique, an XV instruction is issued with RFI enabled that reads a VLIW from the PEs' or SP's memories and for each XV, after the first XV, uses an indirect automatic increment of specified register operand read port addresses to access a new location in the register file.

Figure 7B:
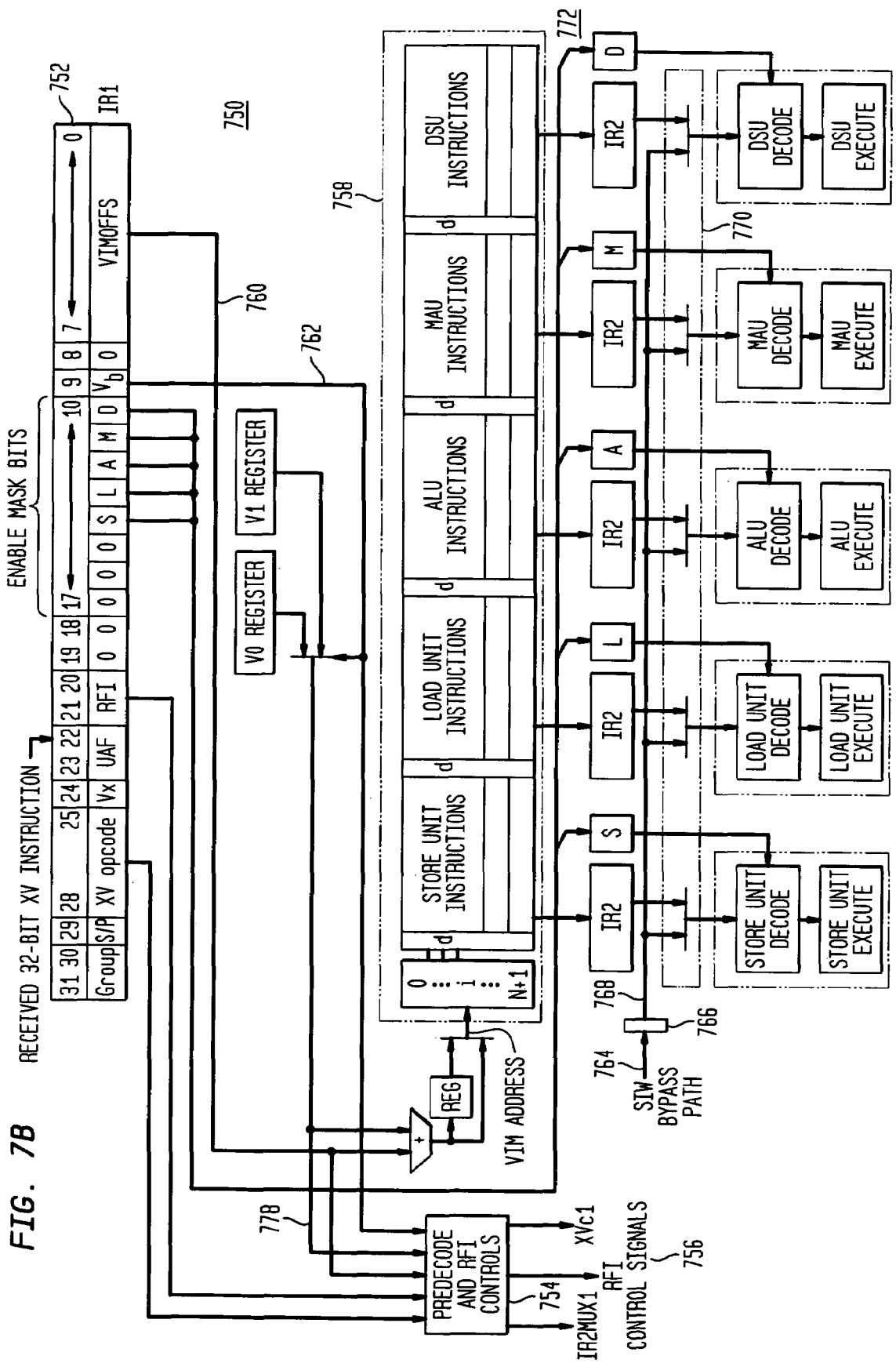
FIG. 7B illustrates an iVLIW XV pipeline with across slot compression (ASC) and power control features in accordance with the present invention.

To minimize power, the VIM need not be accessed for every subsequent XV in a sequence of RFI-XV instructions. Each subsequent RFI-XV would have its VIMOFFS and Vb fields checked. If they match with the previous RFI-XV, then the VIM output stored in the IR2 registers would not have to change and would be reused with only the register operands specified by the RFI operation updated appropriately. FIG. 7B depicts a logical view 750 of an XV1 instruction received into an instruction register 1 (IR1) 752 which through predecode and RFI controls 754 provides a comparison of the VIMOFFS bits 760 the contents of V0 or V1 778, and Vb 762 with the previous XV's value in those fields to control VIM 758 access on subsequent RFI-XVs. To facilitate intervening non-RFI non-iVLIW instructions, the SIW bypass path 764 would control multiplexers 770 to provide a latched version 766 of intervening SIW 768 to the appropriate decode and execution unit while preserving the VIM output in the IR2 registers 772. For further details on XVs and VIM operations, see U.S. Pat. No. 6,173,389 which is incorporated by reference herein in its entirety.

Figure 8:
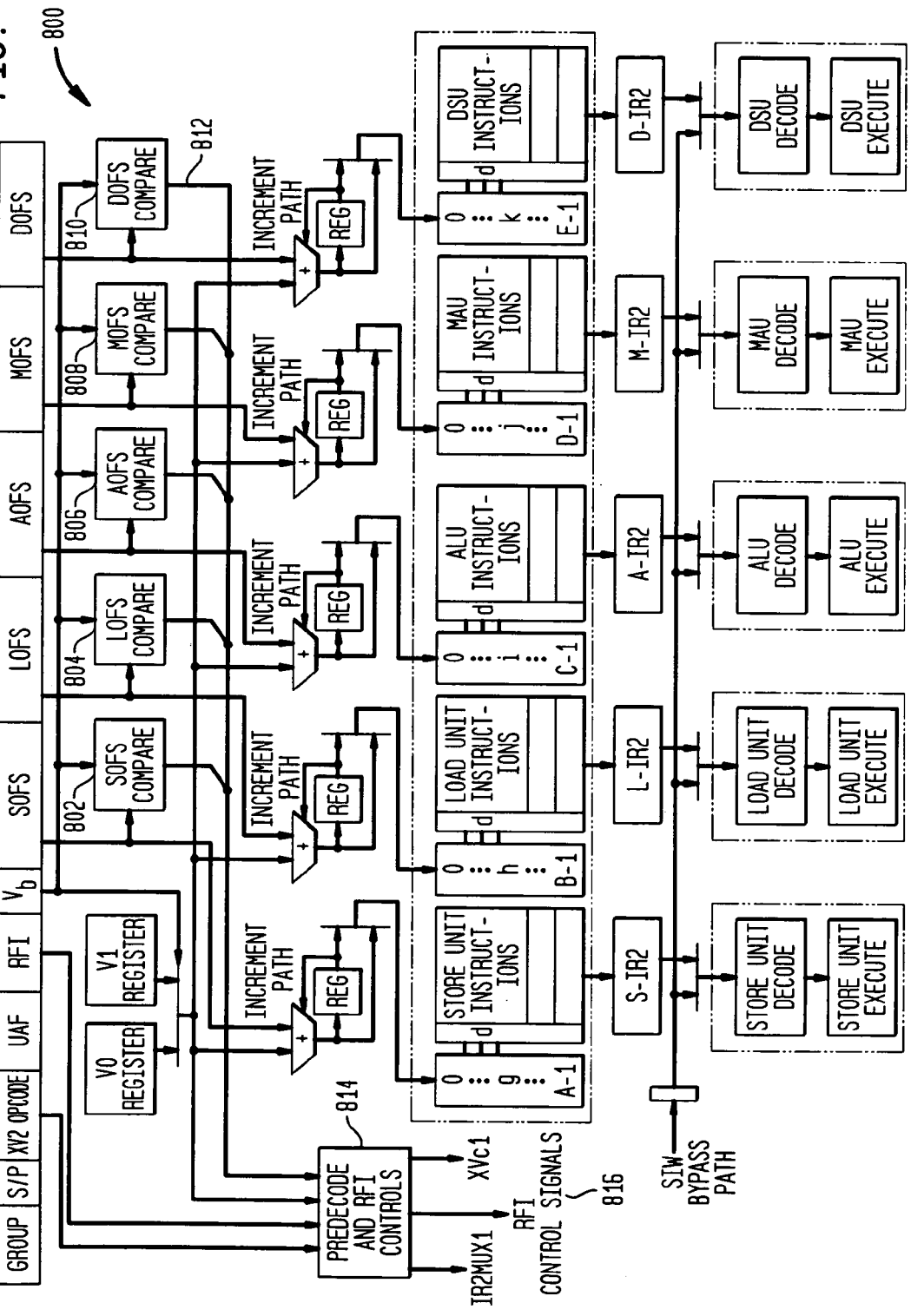
FIG. 8 illustrates an iVLIW XV pipeline with within slot compression (WSC) and power control features in accordance with the present invention.

FIG. 8 depicts an alternative indirect VLIW mechanism 800 in which the VIM is partitioned to associate a separate memory unit with each decode and execution unit. This alternative XV and VIM operation is described in further detail in the above mentioned U.S. Pat. No. 6,173,389. In FIG. 8, a mechanism similar to that employed to make the previous comparison of VIMOFFS and Vb with the XV system of FIG. 7 is shown. However, in the mechanism of FIG. 8, there is a VIM address compare for each decode and execution unit VIM portion. This arrangement is illustrated in the logical view 800 wherein each decode and execution unit has an address and Vb compare unit: store unit SOFS compare 802, load unit LOFS compare 804, ALU unit AOFS compare 806, MAU unit MOFS compare 808, and DSU unit DOFS compare 810. The result of the compares are fed back, via connection 812, to a predecode and RFI controls unit 814 to generate RFI control signals 816. The control signals control whether an execution unit local VIM is accessed or not and whether the execution units IR2 is updated or not.

While the present invention is disclosed in a presently preferred context, it will be recognized that the teachings of the present invention may be variously embodied consistent with the disclosure and claims. By way of example, the present invention is disclosed in connection with specific aspects of a presently preferred ManArray architecture. It will be recognized that this architecture will evolve with time and that the present teachings may be adapted to this evolved architecture, as well as to other present and future architectures to which they may be beneficial.

We claim:

1. A method for conserving power in a processor pipeline during conditional execution of instructions of multiple types, comprising the steps of:

determining in a first pipeline cycle for an instruction of a first type whether subsequent cycles of operation can be stopped for the instruction of the first type based in part on an examination of one or more conditional execution flags during the first pipeline cycle;

determining in a second pipeline cycle for an instruction of a second type whether subsequent cycles of operations can be stopped for the instruction of the second type based in part on an examination of one or more condition execution flags during the second pipeline cycle; and stopping execution at the end of the first pipeline cycle for the first type of instruction or at the end of the second pipeline cycle for the second type of instruction if the conditional execution flags that are examined are determined to be such that no execution is to occur in the subsequent cycles of operation, wherein if the execution is stopped, it is stopped without affecting execution of one or more other instructions already in the processor pipeline.

2. The method of claim 1 wherein said first type of instruction is a load or a store instruction and load and store logic checks for the load or store instruction's execution conditions during the first pipeline cycle which is a decode cycle.

3. The method of claim 1 wherein said conditional execution comprises:

executing packed data type operations which can be conditional for each sub data type in a packed data operation.

4. The method of claim 3 wherein for those packed operations that take two or more cycles to execute, the method further comprises:

stopping execute cycles after a first execute cycle for those sub data operations which have condition flags indicating they are not to complete.

5. The method of claim 1 wherein said second type of instruction is an arithmetic instruction and arithmetic logic checks for the arithmetic instruction's execution conditions during the second pipeline cycle which is a first execution cycle.

6. The method of claim 1 wherein the one or more condition execution flags are set at the end of the execute cycle for the immediately preceding instruction having a single cycle of execution.

7. A method for conserving power in a plurality of processing elements (PEs) during conditional execution of instructions of multiple types where each PE has a pipeline that is separate from a PE pipeline in another PE, comprising the steps of:

determining in a first PE pipeline cycle for an instruction of a first type whether subsequent cycles of operation can be stopped for the instruction of the first type based in part on an examination of one or more conditional execution flags during the first PE pipeline cycle;

determining in a second PE pipeline cycle for an instruction of a second type whether subsequent cycles of operations can be stopped for the instruction of the second type based in part on an examination of one or more condition execution flags during the second PE pipeline cycle; and stopping execution at the end of the first PE pipeline cycle for the first type of instruction or at the end of the second PE pipeline cycle for the second type of instruction without affecting the execution of one or more non-conditional instructions already in the PE pipelines if the conditional execution flags that are examined are determined to be such that no execution is to occur in the subsequent cycles of operation.

8. The method of claim 7 wherein said second type of instruction is an arithmetic instruction and arithmetic instruction logic checks for the arithmetic instruction's execution conditions during the first execution cycle which is the second PE pipeline cycle.

9. The method of claim 8 wherein said arithmetic instruction is an arithmetic instruction having two or more execute cycles.

10. The method of claim 8 wherein said arithmetic instruction is a floating point instruction having two or more execute cycles.

11. The method of claim 7 wherein said first type of instruction is a load or store instruction and load and store logic checks for the load or store instruction's execution conditions during a decode cycle which is the first PE pipeline cycle.

12. The method of claim 7 wherein the first PE pipeline cycle and the second PE pipeline cycle occur in at least one PE.

13. The method of claim 7 wherein the first PE pipeline cycle and the second PE pipeline cycle occur in different PEs.

14. The method of claim 7 wherein the conditional execution flags are generated locally to each PE.

15. The method of claim 14 wherein the conditional execution flags are set at the end of the execute cycle for the immediately preceding instruction in each PE having a single cycle of execution.

16. A method for saving power when conditionally executing instructions contained in a very long instruction word (VLIW), the method comprising:

determining in a first pipeline cycle of a fetched VLIW a first instruction of a first instruction type, a second instruction of a second instruction type, and a condition execution control type for each instruction of the fetched VLIW;

determining to stop execution of the first instruction in the first pipeline cycle in response to the condition execution control type of the first instruction in combination with a condition flag indicating the first instruction should not execute;

determining to stop execution of the second instruction in a second pipeline cycle in response to the condition execution control type of the second instruction in combination with a condition flag indicating the second instruction should not execute; and stopping execution at the end of the first pipeline cycle for the first instruction or at the end of the second pipeline cycle for the second instruction if the condition execution flag that is examined is determined to be such that no execution is to occur in the subsequent cycles of operation, wherein if the execution is stopped, it is stopped without affecting execution of one or more other instructions already in the processor pipeline.

17. The method of claim 16 wherein the first pipeline cycle is a decode cycle and the second pipeline cycle is a first execute cycle.

18. The method of claim 16 wherein the first instruction type is a load or a store instruction and the second instruction type is an arithmetic instruction.

19. The method of claim 16 wherein the condition flag is one of a plurality of condition flags generated by executing a preceding instruction.

20. The method of claim 16 wherein the condition flag is generated by executing a preceding instruction having a single execution cycle.

* * * * *